United States Patent [19]

Vallet et al.

[11] Patent Number: 5,772,777
[45] Date of Patent: Jun. 30, 1998

[54] METHOD FOR PROCESSING COMPOSITE MATERIALS TO ENABLE RECYCLING THEREOF

[75] Inventors: André Vallet, Saint Aubin du Medoc; Michel Delmas, Auzeville-Tolosane; Thierry Fargere, Beauvais; Gilles Sacher, Toulouse, all of France

[73] Assignee: Societe Europeenne de Propulsion, Suresnes, France

[21] Appl. No.: 849,683

[22] PCT Filed: Dec. 14, 1995

[86] PCT No.: PCT/FR95/01671

§ 371 Date: Jun. 12, 1997

§ 102(e) Date: Jun. 12, 1997

[87] PCT Pub. No.: WO96/18484

PCT Pub. Date: Jun. 20, 1996

[30] Foreign Application Priority Data

Dec. 16, 1994 [FR] France .................................. 94 15174

[51] Int. Cl.⁶ ..................................................... B08B 7/04
[52] U.S. Cl. ................................ 134/2; 134/10; 134/42; 65/473; 209/3
[58] Field of Search .................... 134/2, 10, 11, 134/13, 30, 37, 42; 65/23, 27, 30.1, 473; 209/3, 466, 471, 472, 474, 477

[56] References Cited

U.S. PATENT DOCUMENTS

| | | |
|---|---|---|
| 3,375,155 | 3/1968 | Adams ..................................... 65/473 |
| 3,852,108 | 12/1974 | Lindberg ..................................... 134/2 |
| 4,231,998 | 11/1980 | Gutierrez ................................. 423/449 |
| 4,462,815 | 7/1984 | Propster et al. ............................... 65/2 |
| 5,019,171 | 5/1991 | Hanson, Jr. et al. ....................... 134/2 |
| 5,073,273 | 12/1991 | Gupta et al. ............................. 210/760 |
| 5,100,453 | 3/1992 | Richards ..................................... 65/27 |
| 5,264,640 | 11/1993 | Platz ....................................... 585/241 |
| 5,373,067 | 12/1994 | Borredon et al. ....................... 525/388 |
| 5,567,245 | 10/1996 | Watson ....................................... 134/2 |

FOREIGN PATENT DOCUMENTS 2685339  6/1993  France .

OTHER PUBLICATIONS

Database WPI, Section Ch., Week 8231, Derwent Publications Ltd., London, G.B. Class ACS, AN 82–65269E C31! & SU,A,852 900 (Rubezhan Br. Vorosh.), Aug. 7, 1981.

Database WPI, Section Ch., Week 7939, Derwent Publications Ltd., London G.B. Class ACS, AN 79–70765B C39! & JP,A,54 10 182 (Nihon Kogyo K.K.), Aug. 17, 1979.

*Primary Examiner*—Jill Warden
*Assistant Examiner*—Saeed Chaudhry
*Attorney, Agent, or Firm*—Weingarten, Schurgin, Gagnebin & Hayes LLP

[57] ABSTRACT

A method for processing composite materials (matrix+reinforcing fibers) to enable recycling thereof. The method is useful for chemically upgrading materials and comprises exposing the materials to ozone.

14 Claims, No Drawings

METHOD FOR PROCESSING COMPOSITE MATERIALS TO ENABLE RECYCLING THEREOF

This application is a 371 of a PCT/FR/01671, filed on Dec. 14, 1995.

BACKGROUND OF THE INVENTION

The present invention relates to a process for the treatment of composite materials, comprising a matrix and reinforcing fibers, for the purpose of recycling said materials.

Said process is particularly valuable insofar as it is useful for the upgradingof materials. The process in fact enables the fibers to be separated from the matrix and recovered in a state such that they can be recycled as reinforcing fibers.

The question of recycling waste of the composite material type, especially thermosetting and thermoplastic materials, only really arose very recently. The custom was in fact to dump this kind of waste in landfills, which was very practical and economically advantageous.

Now, for some years, especially due to ecological pressure, the number of landfills has been gradually falling and their absorption capacity decreasing. The cost of dumping in landfills is rocketing. Furthermore, the imminent implementation of very strict national and/or Community regulations will limit landfill dumping to non-recyclable waste.

It has therefore become essential to develop processes for the treatment of these composite materials, especially in order to recycle them.

Researches have been conducted in several directions and three principal methods of upgrading said composite materials have been proposed:

"thermal upgrading", whereby said materials are incinerated to produce energy. However, this method is rather unsuitable for composite waste insofar as it has a relatively low calorific value. In fact, the mineral fillers in the matrix, and the reinforcing fibers, which are inert to combustion, can represent up to 70% by weight of said materials. Moreover, the incineration of such materials ultimately produces a large amount of dross.

"material upgrading", whereby said materials are ground and micronized. This mechanical method is particularly valuable insofar as it makes it possible to recover on the one hand the fibers and on the other hand a powder (binder+fillers), which are respectively recyclable as reinforcing fibers and fillers in the production of new composite materials. It is illustrated especially in patent application EP-A-0 443 051. However, this method cannot be used to treat waste contaminated particularly by oils, adhesives, paints, etc.

"chemical upgrading", which has mainly been carried out according to two types of process. In a first variant, said materials are thermally decomposed in the total absence of oxygen (pyrolysis). This seems to be the perfect process for treating contaminated waste. It allows the recovery of organic products (petroleum products), gas of high energy value and an inorganic solid residue (containing the fibers) which can be recycled as fillers in the production of new composite materials. However, it does not allow the fibers to be recovered and recycled as reinforcing fibers. In a second variant, said materials are chemically degraded by hydrogenation, hydrolysis, glycolysis, etc. This variant has given very good results in the glycolysis of polyurethane resins reinforced with glass fibers. The chemical treatment ultimately produces on the one hand polyols, which can be used in the formulation of polyurethane resins (for the production of new composite materials), and glass fibers (virtually intact), which can be used as reinforcing fibers.

Other chemical methods have also been exploited for the upgrading of non-reinforced polymers (not containing fibers) and especially for the recycling of said polymers as texturizers for hydrocarbon binders of the bitumen type. The following have been described in particular:

in patent application FR-A-2 569 416, the action of ozone on a polyolefin (polyethylene) in order to activate said polyolefin and thereby render it compatible with the bitumen;

in patent application FR-A-2 663 640, the action of ozone under special conditions in order to decrosslink crosslinked polymers based on ethylene/vinyl acetate (EVA).

According to the teaching of these documents, ozone is capable of causing crosslinked polymer materials to decrosslink into polymer fragments whose molecular weight is less than that of said crosslinked polymer materials, and of generating reactive groups (peroxides, hydroperoxides) on the surface of said fragments.

SUMMARY OF THE INVENTION

According to the invention, a process for the treatment of reinforced composite materials is now proposed, at the end of which the reinforcing fibers are recovered and can be recycled as reinforcing fibers.

Said process is useful for the chemical upgrading of materials and is suitable for the treatment of contaminated composite materials.

As a characteristic feature, it comprises exposing said materials to ozone.

The process of the invention does not relate to the treatment of materials whose matrix contains an alkali metal nitride and at least one oxidizing agent liable to react with said nitride. The treatment of such materials—in the form of particles with a diameter less than or equal to 2 mm—is described in patent U.S. Pat. No. 5,073,273 and also involves ozone, which converts said nitride to nitrogen and nitrate. In composite materials as understood in the invention, ozone develops quite a different action.

The Applicant has made the totally surprising observation that, under the action of ozone, composite materials comprising a matrix and reinforcing fibers do not dissociate into random fragments but undergo a "clean" breakdown of structure, specifically by separation of said fibers from said matrix. This is genuinely surprising insofar as those skilled in the art are well aware of the strength of the matrix/fiber bond generated when composite materials are produced.

In the general context of processes for the upgrading of composite materials, a chemical process is therefore proposed, according to the invention, which separates the fibers from the matrix without degrading said fibers. When said process has been carried out, the fibers are easy to recover and can be recycled as reinforcing fibers. This recycling (reinforcing fibers→reinforcing fibers) is in itself very valuable in that it upgrades the product (more than a recycling of the type reinforcing fibers→mineral fillers), but is all the more valuable because the fibers are recycled in a form which facilitates their subsequent incorporation into a matrix. In fact, said fibers are recovered, after the treatment according to the invention, with active sites (peroxy, hydroperoxy groups) on their surface. These sites result from the action of ozone on the "covering" of resin remaining on the surface of said fibers. The presence of these sites simplifies the incorporation of the recycled fibers into the matrix. It will be possible to carry out said incorporation using less catalyst or even no catalyst at all. The process of the invention is particularly efficient in this respect.

Said process furthermore enables the matrix to be recovered. Said matrix, which is generally reduced to powder of variable particle size (depending especially on the ozonization conditions and the particle size of the starting composite materials), can be recycled as fillers in the context of the production of composite materials.

According to the invention, the composite materials are therefore treated with a stream of ozone. Said stream can be produced with any type of conventional ozone generator and especially with a cold plasma reactor from oxygen.

In general, according to the invention, said ozone is used as a mixture with oxygen.

The ozonization can be carried out according to different variants. In particular, the ozone, optionally mixed with oxygen, can be brought into contact with the material to be treated in a fluidized bed, or bubbled into a liquid in which the material to be treated is dispersed.

Whichever variant is used to react the ozone with the composite materials, a third substance, called an ozone vector, is advantageously used according to the invention. This substance, which is non-degradable or only slightly degradable by ozone, is advantageously used to prepare, or sensitize, the materials to be treated and/or the materials treated by ozonization. In fact, according to certain variants of the invention, it can be used before the ozonization, together with said ozonization or, advantageously, before and together with said ozonization.

The material to be treated, brought into contact with this substance, can become impregnated therewith and thus become more sensitive to ozonization.

Said ozone vector can be used in the liquid and/or gaseous state in the process of the invention.

According to the first variant of said process referred to above (carried out in a fluidized bed), said substance is advantageously sent into the fluidized bed together with the ozone. According to this variant, said substance generally consists of an inert gas. Such an inert gas, for example nitrogen or argon, is used particularly to maintain fluidization and to dilute and guide the ozone.

According to the second variant of said process referred to above (carried out by bubbling ozone into a liquid), said substance can consist of the liquid in which the materials to be treated are dispersed. It may also constitute only part of said liquid. It is advantageously selected from chlorobutane, 1,1,1-trichloroethane, dichloromethane, carbon tetrachloride, methyl ethyl ketone, dimethylformamide and water. This list is in no way exhaustive. Those skilled in the art wishing to optimize the implementation of the process of the invention for the treatment of this type of composite materials will know, if necessary, how to select a suitable ozone vector from the above compounds and, more generally, from products classed as solvents which are relatively inert to ozone. It is emphasized here that, within the framework of the process of the invention, said substance does not act as a solvent.

Within the framework of this second variant of the process of the invention (carried out by bubbling ozone into a liquid which is advantageously an ozone vector), the operating pressure is advantageously above atmospheric pressure. The ozonization reaction can thus be carried out "in the liquid phase" at a higher temperature.

Those skilled in the art will be capable of optimizing the operating parameters of the ozonization reaction, especially the pressure, temperature, residence time, particle size of the treated materials, etc.

Very good results have been obtained particularly by bubbling mixtures of ozone and oxygen into liquid ozone vectors laden with particles of composite materials, at atmospheric pressure, at temperatures between 20° C. and 50° C., for about 5 hours. Those skilled in the art will easily understand that by operating under more draconian conditions, especially pressure conditions, it is possible for example to reduce the reaction time or treat larger particles.

The particle size of the treated materials is actually an important parameter of the ozonization reaction. It is apparent, however, that to achieve the result in the process of the invention, it is in no way obligatory to expose very fine particles to ozone. It is possible to treat particles with a particle size well above 2 mm under quite reasonable operating conditions. This constitutes a considerable asset of the process of the invention. In general, however, for practical reasons and in view of the dimensions of the materials to be treated, the ozonization according to the invention will be carried out on composite materials which have been very coarsely ground beforehand.

Another asset of the process of the invention is its wide field of application. The result (material upgrading of the matrix and the fibers) supports the fact that it can be used for the treatment (recycling) of numerous types of composite materials.

Incidentally, it is pointed out here that it is suitable for the treatment of contaminated composite materials.

It is particularly suitable for the treatment of composite materials comprising a matrix of the thermosetting, thermoplastic or ceramic type. More precisely, the ozonization according to the invention can be used especially to treat composite materials whose matrix is based on:
  a thermosetting resin, for example a phenolic, epoxy, unsaturated polyester or polyurethane resin;
  a thermoplastic resin, for example a polyamide, polyethylene or polycarbonate resin or a resin capable of generating SRTs (stampable reinforced thermoplastics);
  a ceramic, for example of the type based on SiC, C, etc.; ceramic matrices encompass carbon matrices here.
Conventionally said matrix also contains mineral fillers.

It is reinforced with fibers which can consist particularly of ceramic fibers (SiC, alumina, aluminate, etc.), carbon fibers, glass fibers, Kevlar® fibers (aromatic polyamide fibers) or boron fibers. Said fibers, either short or long, are present in the matrix in a random or structured arrangement. They are present therein especially in the form of dispersed fibers or in the form of structured reinforcements of the woven or non-woven type.

As stated above, the field of application of the invention is therefore very wide.

Those skilled in the art will already have grasped the full value of the process of the invention, which will advantageously be exploited in the context of the vast market for the recycling of thermosetting molding materials composed of unsaturated polyester resins, glass fiber reinforcing textiles, fillers and additives. These molding materials, which are shaped under the action of temperature and pressure, are very widely used at present, especially in the automobile and electrical industries. They are available in the form of flat SMC (sheet molding compound) resin matting, also called prepreg, or pasty molding material called BMC (bulk molding compound) or DMC (dough molding compound). The value of the process of the invention is just as obvious in the more restricted market of composite materials whose structure contains fibers of very high added value.

The value of said process is all the more obvious because it makes it possible to recover fibers which can be recycled as reinforcing fibers and which contain reactive sites (groups) on their surface.

The invention claimed in the present specification is illustrated by the following Example.

Particles of about 1 mm, obtained by the filing of a composite material of the SMC (sheet molding compound) type, were treated by ozonization. Said material comprises a matrix (unsaturated polyester resin+calcium carbonate) reinforced with glass fibers. Said particles (50 g) were placed in a reactor containing one liter of $CH_2Cl_2$. An oxygen/ozone mixture was bubbled into said reactor, kept at 50° C. The flow rate of the gaseous mixture was set to 0.4 liter per minute; the ozone was prepared in a cold plasma reactor from air containing 50 mg/l of oxygen.

The bubbling was stopped after 5 hours. After decantation of the reaction medium, a very fine powder was seen in the bottom of the reactor and the glass fibers of about 1 mm were seen floating on the surface of the liquid.

The presence of peroxy and hydroperoxy groups on the recovered glass fibers was demonstrated.

Such fibers are perfectly suitable for the production of a new composite material of the BMC type, into which they are incorporated as reinforcing fibers.

We claim:

1. A process for the treatment of composite materials comprising a matrix and reinforcing fibers, the purpose of said process being to separate said fibers from said matrix in order particularly to recover said fibers, which can be recycled as reinforcing fibers, characterized in that said materials are exposed to ozone, to the exclusion of the treatment of materials whose matrix contains an alkali metal nitride and at least one oxidizing agent liable to react with said nitride.

2. A process according to claim 1, characterized in that the ozone is used as a mixture with oxygen.

3. A process according to claim 1, characterized in that, before and/or at the same time as exposure to ozone, said materials are brought into contact with a substance called an ozone vector, which is non-degradable or only slightly degradable by ozone.

4. A process according to claim 3, characterized in that said substance is used in the liquid and/or gaseous state.

5. A process according to claim 3, characterized in that said substance is selected from chlorobutane, 1,1,1-trichloroethane, dichloromethane, carbon tetrachloride, methyl ethyl ketone, dimethylformamide, water and inert gases.

6. A process according to claim 1, characterized in that said materials are dispersed in a liquid ozone vector into which the ozone is bubbled.

7. A process according to claim 6, characterized in that it is carried out at a pressure above atmospheric pressure.

8. A process according to claim 1, characterized in that ozone and an ozone vector are sent into a fluidized bed of said materials.

9. A process according to claim 1, characterized in that it is carried out with ground composite materials.

10. A process according to claim 1, characterized in that it is carried out with contaminated composite materials.

11. A process according to claim 1, characterized in that said matrix is of the thermosetting, thermoplastic or ceramic type.

12. A process according to claim 1, characterized in that said reinforcing fibers consist of ceramic fibers, carbon fibers, glass fibers, aromatic polyamide fibers or boron fibers.

13. A process according to claim 1, characterized in that it is used for the treatment of glass fiber/polyester composite materials.

14. A process according to claim 1, characterized in that the separated fibers contain reactive groups on their surface.

* * * * *